(12) United States Patent
Badger

(10) Patent No.: US 8,462,768 B2
(45) Date of Patent: Jun. 11, 2013

(54) PROVIDING SESSION INITIATION PROTOCOL (SIP) CALL CONTROL FUNCTIONS TO PUBLIC SWITCHED TELEPHONE NETWORK (PSTN)-BASED CALL CONTROLLER

(75) Inventor: Brian S Badger, Divide, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1200 days.

(21) Appl. No.: 12/137,228

(22) Filed: Jun. 11, 2008

(65) Prior Publication Data

US 2009/0310595 A1 Dec. 17, 2009

(51) Int. Cl.
*H04L 12/66* (2006.01)

(52) U.S. Cl.
USPC .......................................................... 370/352

(58) Field of Classification Search
USPC ......................................... 370/352, 259–271
See application file for complete search history.

(56) References Cited

U.S. PATENT DOCUMENTS

| 7,920,529 | B1 * | 4/2011 | Mahler et al. ................. | 370/338 |
| 2004/0258238 | A1 * | 12/2004 | Wong ............................ | 379/900 |
| 2005/0058125 | A1 * | 3/2005 | Mutikainen et al. .......... | 370/354 |
| 2006/0023658 | A1 | 2/2006 | Phillips et al. | |
| 2006/0210041 | A1 | 9/2006 | Citron et al. | |
| 2007/0019623 | A1 * | 1/2007 | Alt et al. ........................ | 370/352 |
| 2007/0047522 | A1 | 3/2007 | Jefferson et al. | |
| 2007/0242626 | A1 * | 10/2007 | Altberg et al. ................. | 370/259 |
| 2008/0123849 | A1 * | 5/2008 | Samayamantry et al. ..... | 380/255 |
| 2008/0144615 | A1 * | 6/2008 | Casey ............................ | 370/389 |
| 2009/0043704 | A1 * | 2/2009 | Bantukul et al. ............... | 705/42 |
| 2009/0164645 | A1 * | 6/2009 | Sylvain .......................... | 709/228 |
| 2009/0187919 | A1 * | 7/2009 | Maes ............................. | 719/313 |
| 2009/0262729 | A1 * | 10/2009 | Citron et al. ................... | 370/352 |
| 2010/0091706 | A1 * | 4/2010 | Noldus et al. .................. | 370/328 |
| 2010/0198954 | A1 * | 8/2010 | Grasso et al. .................. | 709/223 |
| 2011/0026700 | A1 * | 2/2011 | Clark et al. ................. | 379/142.15 |

FOREIGN PATENT DOCUMENTS

| CN | 1874328 | 12/2006 |
| WO | 2006/101952 | 9/2006 |

OTHER PUBLICATIONS

Sparks, "The Session Initiation Protocol (SIP) Refer Method", Apr. 2003, (RFC 3515), pp. 1-22.

* cited by examiner

*Primary Examiner* — Mark Rinehart
*Assistant Examiner* — Christopher R Crompton

(57) ABSTRACT

A device receives information associated with an outbound call from a calling party via a Public Switched Telephone Network (PSTN), and generates a request for the outbound call from the Public Switched Telephone Network (PSTN) using a remote procedure call (RPC) interface. The device also enables communication, via the remote procedure call (RPC) interface, of the outbound call with a Session Initiation Protocol (SIP)-based device associated with a called party.

22 Claims, 13 Drawing Sheets

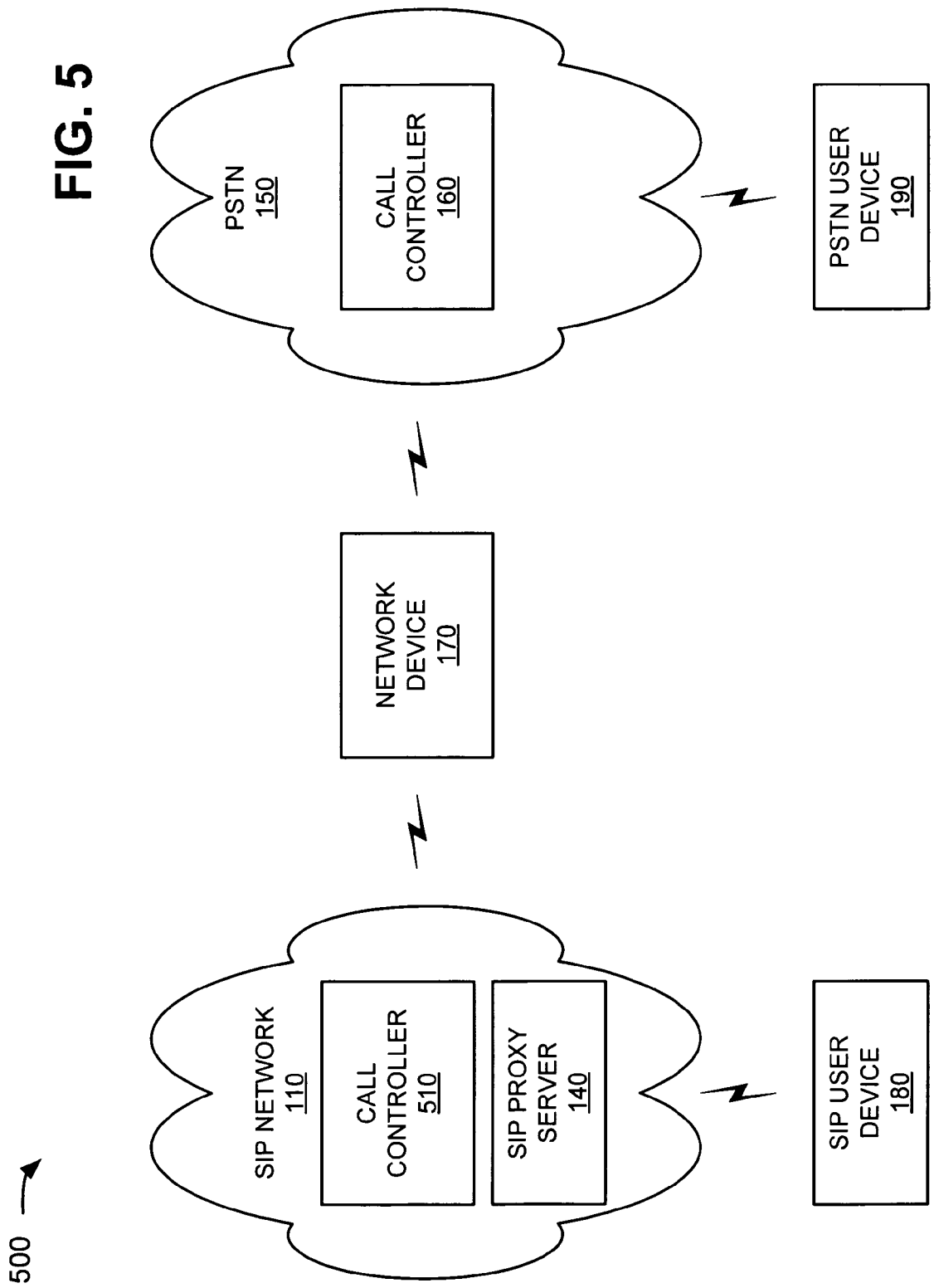

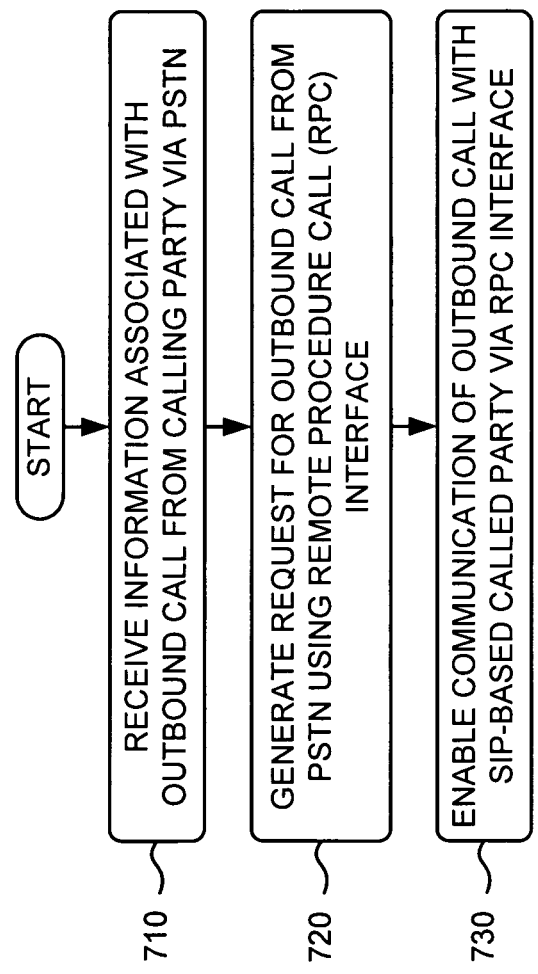

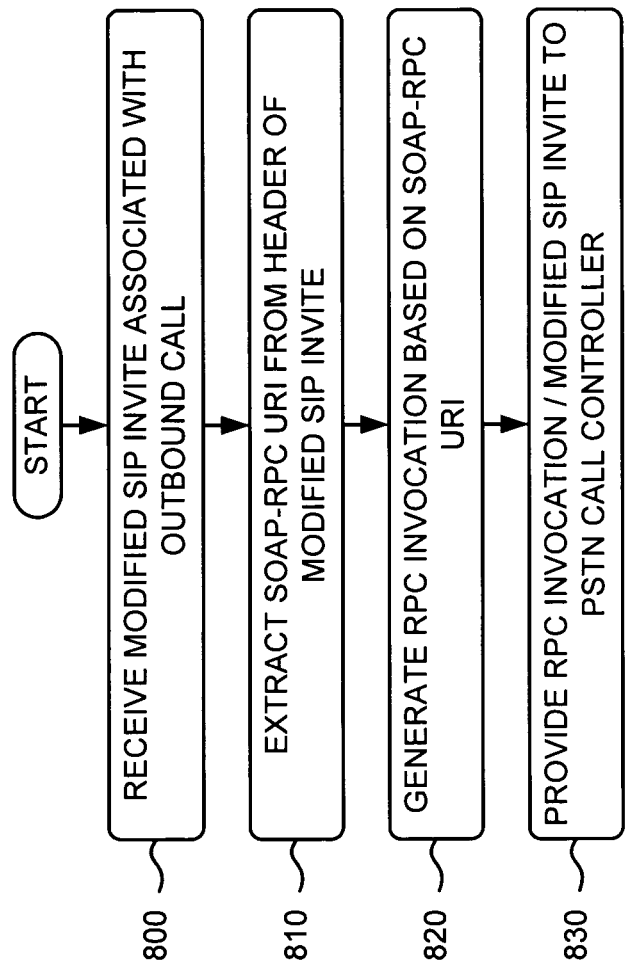

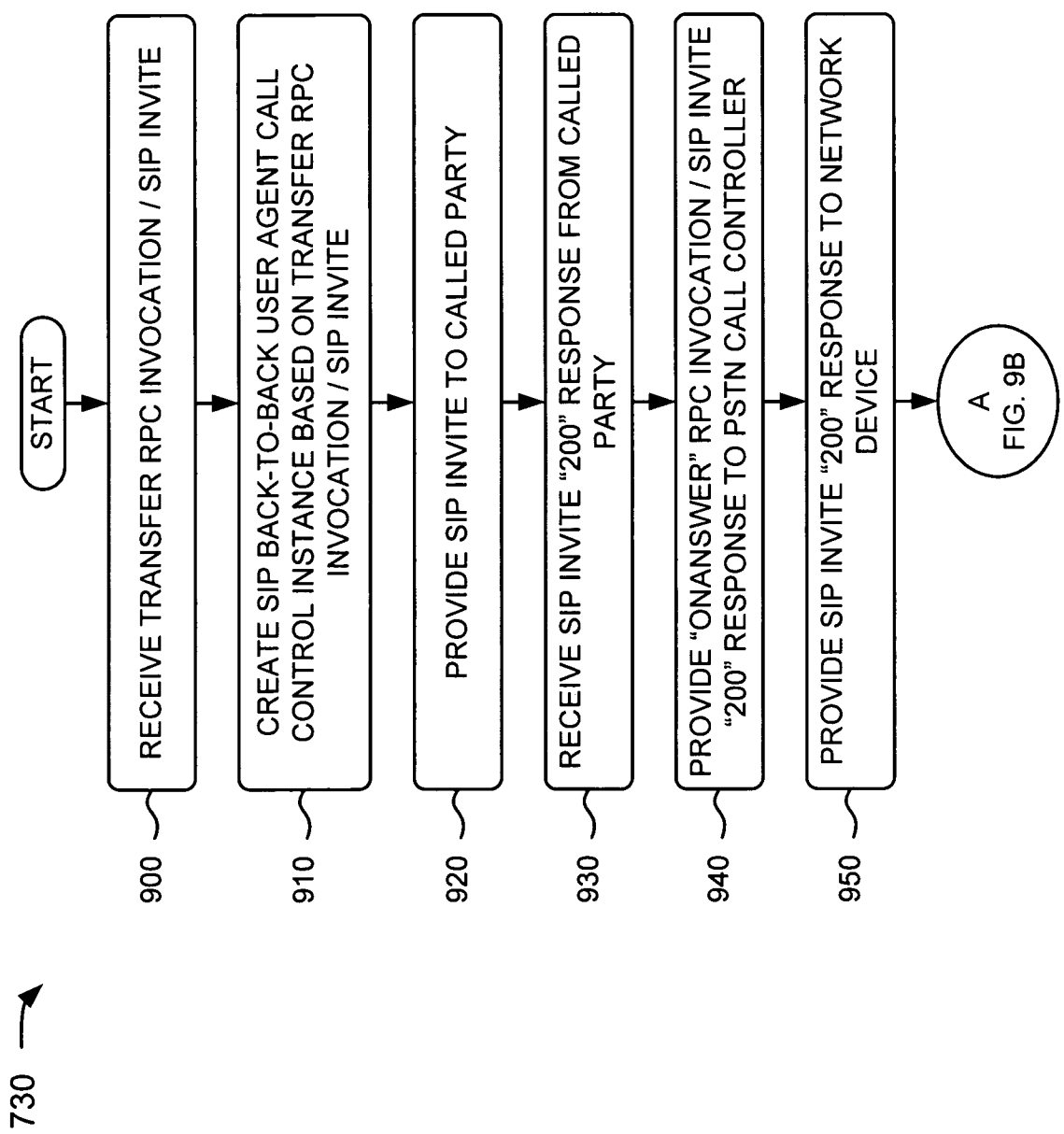

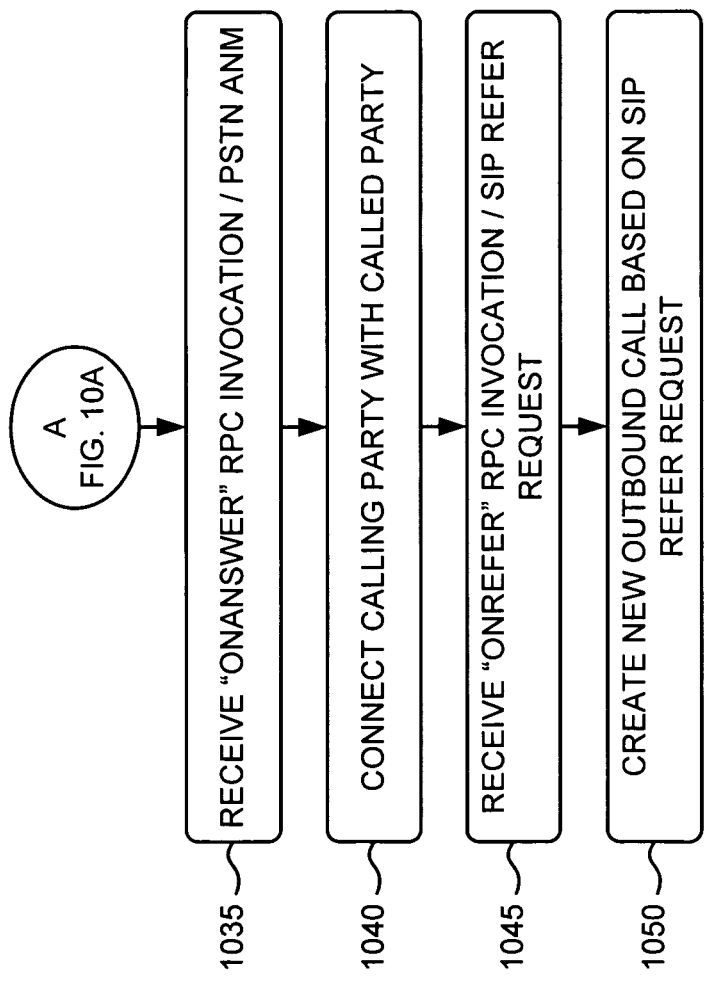

PROVIDING SESSION INITIATION PROTOCOL (SIP) CALL CONTROL FUNCTIONS TO PUBLIC SWITCHED TELEPHONE NETWORK (PSTN)-BASED CALL CONTROLLER

BACKGROUND

Session Initiation Protocol (SIP) is an application-layer control (i.e., signaling) protocol for creating, modifying, and terminating sessions with one or more participants. These sessions may include Internet-based telephone calls, multimedia distribution, multimedia conferences, instant messaging conferences, interactive voice response (IVR), automated and manual operator services, automatic call distribution, call routing, etc. SIP invitations or SIP INVITE requests may be used to create sessions and may carry session descriptions that allow participants to agree on a set of compatible media types. SIP may use proxy servers to help route requests to a user's current location, authenticate and authorize users for services, implement provider call-routing policies, and/or provide other features to users. SIP may also provide a registration function that allows users to upload their current locations for use by proxy servers.

Integrated Services Digital Network (ISDN) User Part (ISUP) is a part of the Signaling System #7 (SS7) that is used to set up telephone calls in the Public Switched Telephone Network (PSTN). The field of SIP-to-ISUP and ISUP-to-SIP communications uses a defined standard mapping of ISUP messages to SIP messages, and defines which parameters are copied and how they are copied. For example, an ISUP-to-SIP gateway may implement the standard mapping. However, routing of calls from a PSTN (e.g., an ISUP-based network) to a SIP network does not expose special capabilities of the SIP network to the PSTN. For example, proprietary SIP headers, which are not defined in the standard mapping, will not be populated.

One feature missing from the standard mapping is support for a SIP REFER method (e.g., special call transfer capabilities supported by SIP, as described in the Internet Engineering Task Force (IETF) document RFC 3515). For example, an ISUP-to-SIP gateway is unable to map the SIP REFER method, and the PSTN provides no such functionality.

BRIEF DESCRIPTION OF THE DRAWINGS

FIG. 5 depicts a diagram of an alternative exemplary network in which systems and methods described herein may be implemented;

FIGS. 7-10B illustrate flow charts of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide one or more SIP call control functions to a PSTN-based call controller. The systems and/or methods may utilize a remote call controller, provided in a SIP network, which may present a secure Remote Procedure Call (RPC) interface to a call controller provided in a PSTN. For example, in one implementation, the remote call controller may receive an outbound call from a calling party, via the PSTN call controller, and may generate a request for the outbound call from the PSTN call controller using the RPC interface. The generated request may enable communication of the outbound call with a SIP-based called party, via the RPC interface. In one example, the PSTN call controller may modify, route, and/or control communications with the SIP-based called party, via the RPC interface.

In one exemplary implementation, the systems and/or methods may intercept SIP messages in the SIP network, and may send a notification to the PSTN call controller. The systems and/or methods may further provide a set of SIP call control functions via the secure RPC interface, which may enable the PSTN call controller to perform SIP-specific operations on a call provided in the SIP network.

Figure 1:
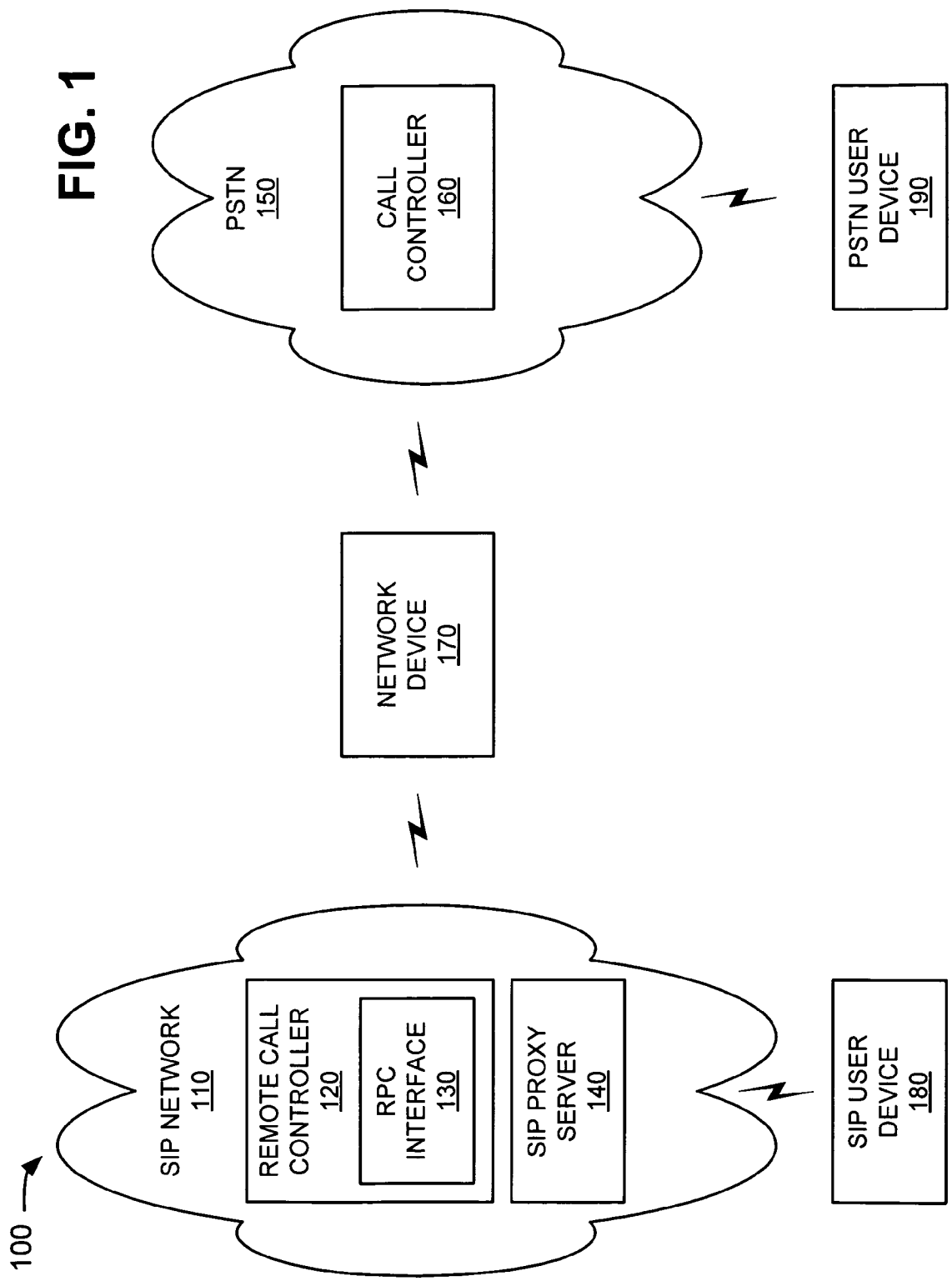
FIG. 1 depicts a diagram of an exemplary network in which systems and methods described herein may be implemented.

FIG. 1 is a diagram of an exemplary network 100 in which systems and methods described herein may be implemented. As illustrated, network 100 may include a first network (e.g., a SIP network 110) that includes a remote call controller 120, a RPC interface 130 associated with remote call controller 120, and a SIP proxy server 140. Network 100 may also include a second network (e.g., PSTN 150) that includes a call controller 160. SIP network 110 may interconnect with PSTN 150 via a network device 170, and may interconnect with a SIP user device 180. PSTN 150 may interconnect with SIP network 110 via network device 170, and may interconnect with a PSTN user device 190. Components of network 100 may interconnect via wired and/or wireless connections. A single SIP network, remote call controller, RPC interface, SIP proxy server, PSTN, call controller, network device, SIP user device, and PSTN user device have been illustrated in FIG. 1 for simplicity. In practice, there may be more SIP networks, remote call controllers, RPC interfaces, SIP proxy servers, PSTNs, call controllers, network devices, SIP user devices, and/or PSTN user devices. Also, in some instances, one or more of the components of network 100 may perform one or more functions described as being performed by another one or more of the components of network 100.

SIP network 110 may include a SIP-based local area network (LAN), a SIP-based wide area network (WAN), a SIP-based metropolitan area network (MAN), a SIP-based intranet, the Internet, a VoIP-based network, or a combination of SIP-based networks.

Remote call controller 120 may include one or more server entities, or other types of computation or communication devices, that gather, process, search, and/or provide information in a manner described herein. In one implementation, remote call controller 120 may include a server (e.g., a computer system or an application) capable of facilitating SIP-based communications, e.g., Internet-based telephone calls, multimedia distribution, multimedia conferences, instant messaging conferences, interactive voice response (IVR), automated and manual operator services, automatic call distribution, call routing, etc.

RPC interface 130 may include a mechanism that permits client and server applications to communicate. RPC interface 130 may provide a common interface between applications, and may make client/server interaction easier by factoring out common tasks, such as synchronization, data flow handling, etc. In one implementation, RPC interface 130 may be provided with remote call controller 120. In another implementation, RPC interface 130 may be provided with a device other than remote call controller 120.

SIP proxy server 140 may include a device that facilitates the establishment of SIP calls. A "SIP call" may include any out-of-dialog or dialog-establishing SIP method (e.g., a SIP INVITE request or message, a SIP SUBSCRIBE request, a SIP REFER request, a SIP OPTIONS request, a SIP MESSAGE request, a SIP REGISTER request, etc.). SIP proxy server 140 may act as both a server and a client for the purpose of making requests on behalf of other clients. SIP proxy server 140 may service requests internally or by passing them on, possibly after translation, to other servers. SIP proxy server 140 may interpret and, if necessary, rewrite a request message before forwarding it.

PSTN 150 may include a Public Land Mobile Network (PLMN), a telephone network, such as the PSTN or a cellular telephone network, or a combination of networks. In one implementation, PSTN 150 may utilize ISUP to set up telephone calls.

Call controller 160 may include one or more server entities, or other types of computation or communication devices, that gather, process, search, and/or provide information in a manner described herein. In one implementation, call controller 160 may include a server (e.g., a computer system or an application) capable of facilitating PSTN-based (e.g., ISUP-based) communications.

Network device 170 may include a data transfer device, such as a gateway (e.g., an ISUP-to-SIP gateway), a router, a switch, a firewall, a network interface card (NIC), a hub, a bridge, a proxy server, an optical add-drop multiplexer (OADM), a line access multiplexer (LAM), a permanent or private virtual circuit (PVC), links provided between any of the aforementioned devices, or some other type of device that processes and/or transfers data. In one implementation, network device 170 may be capable of establishing an end-to-end path between components of network 100 (e.g., between components of SIP network 110 and components of PSTN 150).

SIP user device 180 may include a SIP-based device. For example, SIP user device 180 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, a VoIP-based device, or other types of computation or communication devices, threads or processes running on these devices, and/or objects executable by these devices.

PSTN user device 190 may include a PSTN-based device. For example, PSTN user device 190 may include a plain old telephone service (POTS) telephone, a radiotelephone, a PCS terminal (e.g., that may combine a cellular radiotelephone with data processing and data communications capabilities), or other types of communication devices, threads or processes running on these devices, and/or objects executable by these devices.

Figure 2:
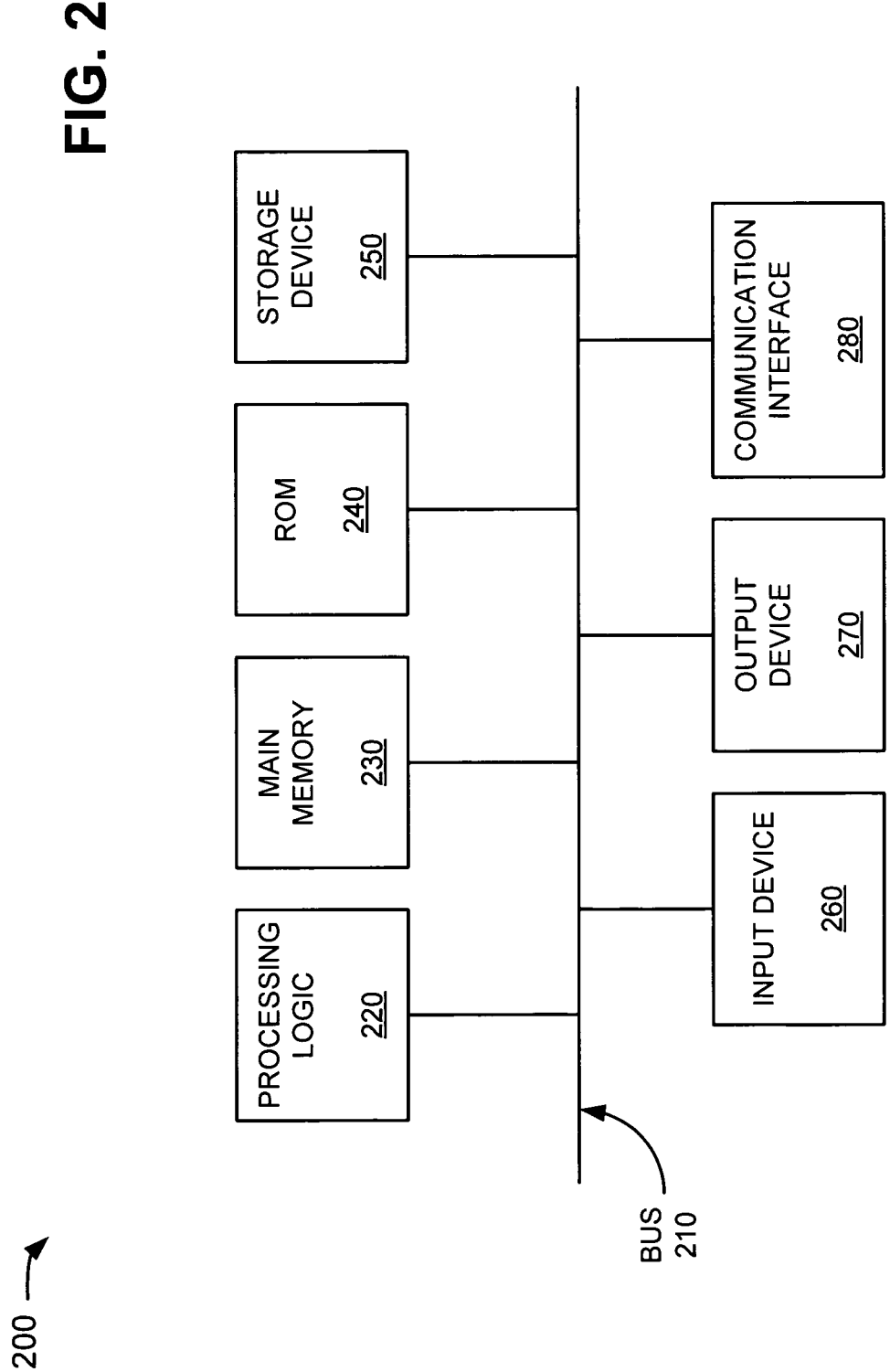
FIG. 2 illustrates exemplary components of a remote call controller, a SIP proxy server, a call controller, and/or a SIP user device of the network depicted in FIG. 1.

FIG. 2 is an exemplary diagram of a device 200 that may correspond to any of remote call controller 120, SIP proxy server 140, call controller 160, SIP user device 180, and/or PSTN user device 190. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as SIP network 110 and/or PSTN 150.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
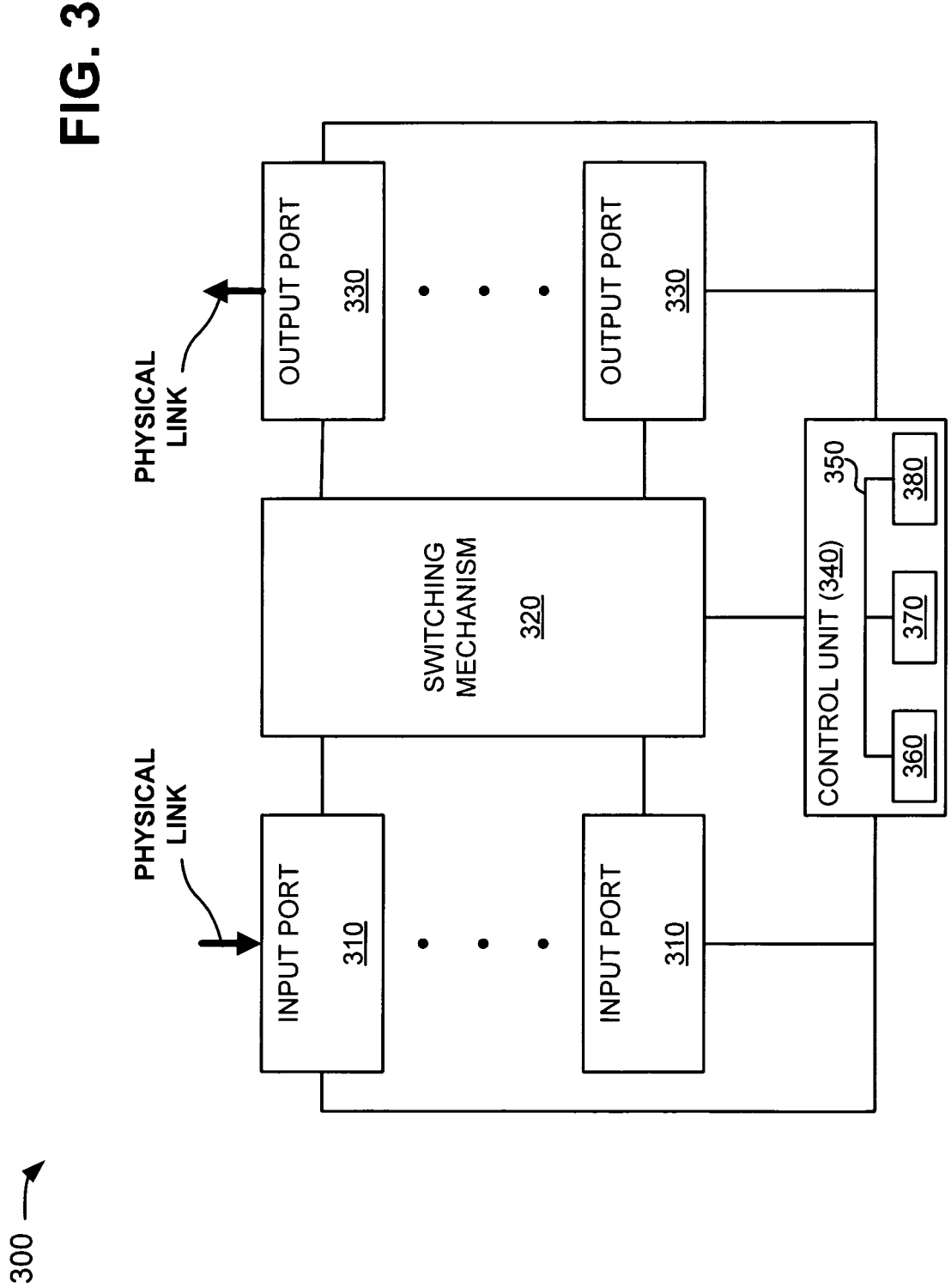
FIG. 3 depicts exemplary components of a network device, the SIP user device, and/or a PSTN user device of the network illustrated in FIG. 1.

FIG. 3 is an exemplary diagram of a device 300 that may correspond to network device 170. As illustrated, device 300 may include input ports 310, a switching mechanism 320, output ports 330, and/or a control unit 340.

Input ports 310 may be the points of attachments for physical links and may be the points of entry for incoming traffic. Input ports 310 may look up a destination address of incoming traffic (e.g., any type or form of data, such as packet or non-packet data) in a forwarding table to determine its destination port (i.e., route lookup). In order to provide quality of service (QoS) guarantees, input ports 310 may classify traffic into predefined service classes. Input ports 210 may run datalink-level protocols and/or network-level protocols.

Switching mechanism 320 may provide a link between input ports 310 and output ports 330. For example, switching mechanism 320 may include a group of switching devices that route traffic from input ports 310 to output ports 330.

Output ports 330 may store traffic before it is transmitted on an output link. Output ports 330 may include scheduling processes that support priorities and guarantees. Output ports 330 may support a variety of higher-level protocols.

Control unit 340 may interconnect with input ports 310, switching mechanism 320, and output ports 330. Control unit 340 may compute a forwarding table, use routing protocols, and/or run software to configure and manage device 300. Control unit 340 may handle any traffic whose destination address may not be found in the forwarding table.

In one implementation, control unit 340 may include a bus 350 that may include a path that permits communication among a processor 360, a memory 370, and a communication interface 380. Processor 360 may include a microprocessor or processing logic (e.g., an application specific integrated circuit (ASIC), field programmable gate array (FPGA), etc.) that may interpret and execute instructions. Memory 370 may include a random access memory (RAM), a read only memory (ROM) device, a magnetic and/or optical recording medium and its corresponding drive, and/or another type of static and/or dynamic storage device that may store information and instructions for execution by processor 360. Communication interface 380 may include any transceiver-like mechanism that enables control unit 340 to communicate with other devices and/or systems.

Device 300 may perform certain operations described herein. Device 300 may perform these operations in response to processor 360 executing software instructions contained in a computer-readable medium, such as memory 370. The software instructions may be read into memory 370 from another computer-readable medium, such as a data storage device, or from another device via communication interface 380. The software instructions contained in memory 370 may cause processor 360 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, or additional components than depicted in FIG. 3. In still other implementations, one or more components of device 300 may perform one or more other tasks described as being performed by one or more other components of device 300.

Figure 4A:
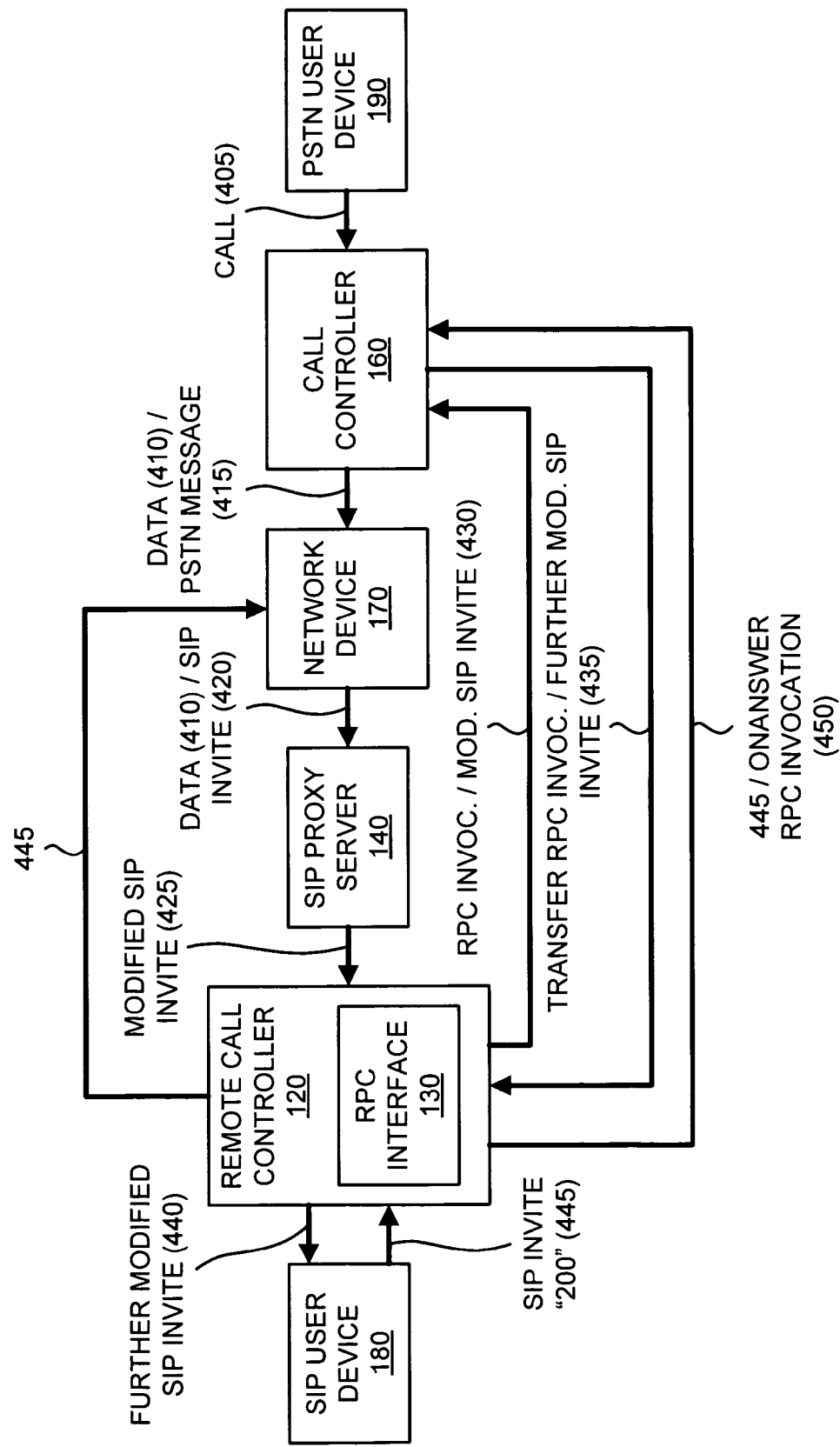
FIGS. 4A and 4B illustrate diagrams of an exemplary portion of the network depicted in FIG. 1, and interactions among the components of the exemplary network portion.
Figure 4B:
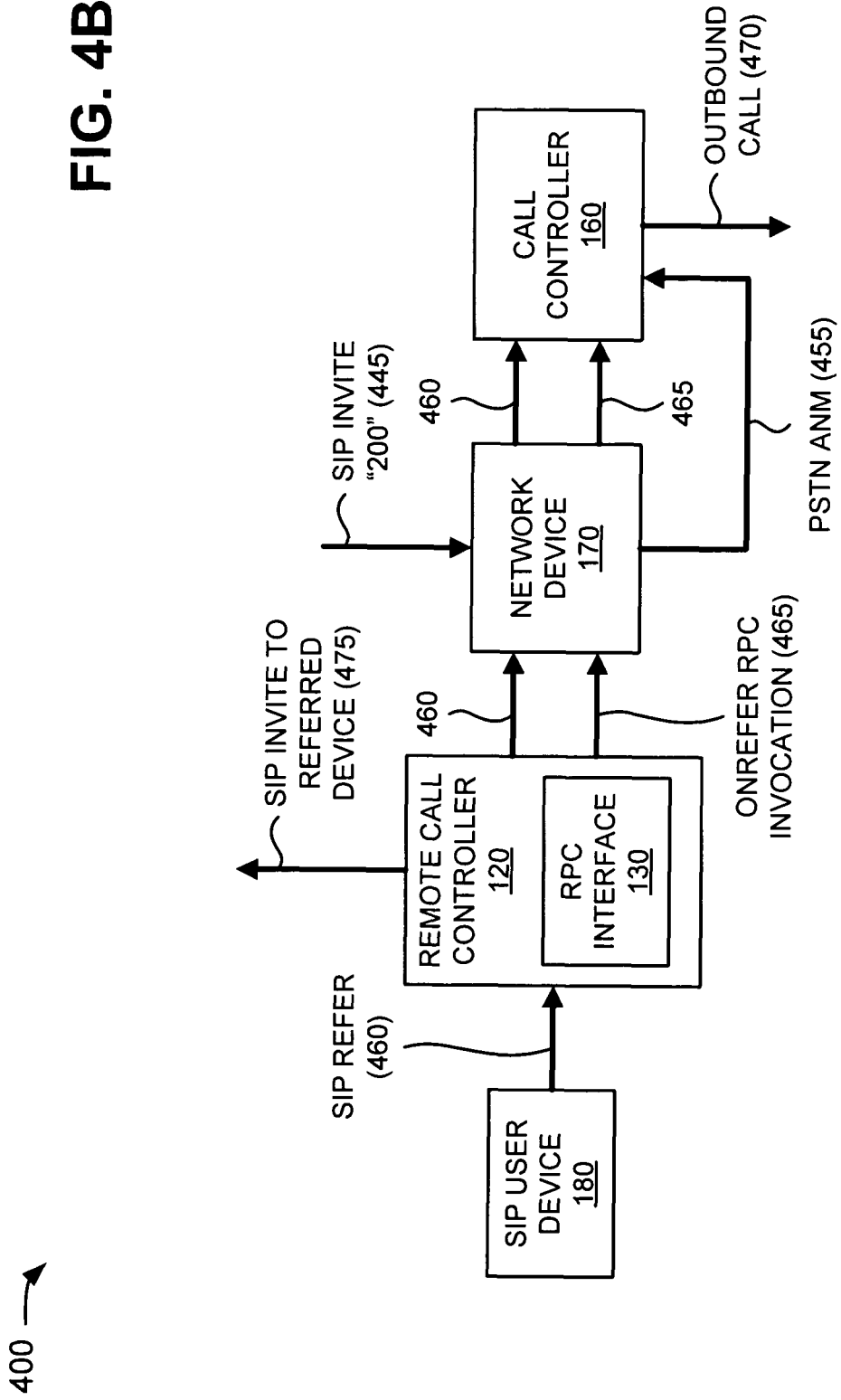

FIGS. 4A and 4B illustrate diagrams of an exemplary portion 400 of network 100, and exemplary interactions among the components of network portion 400. As illustrated in FIG. 4A, exemplary network portion 400 may include remote call controller 120, RPC interface 130, SIP proxy server 140, call controller 160, network device 170, SIP user device 180, and PSTN user device 190. Remote call controller 120, RPC interface 130, SIP proxy server 140, call controller 160, network device 170, SIP user device 180, and PSTN user device 190 may include the features described above in connection with, for example, FIG. 1.

As shown in FIG. 4A, a calling party may originate a call 405 (e.g., an ISUP call), using PSTN user device 190, to a telephone number associated with PSTN 150 (not shown in FIG. 4A). PSTN 150 may route call 405 to call controller 160. Call controller 160 may interact with the calling party, via PSTN user device 190, and may decide (e.g., based on the interaction) to transfer call 405 to a called party (e.g., a customer service representative) associated with SIP user device 180. Call controller 160 may identify a termination for SIP user device 180, and may generate data 410 and a PSTN message 415. Data 410 may include a data couplet of an outbound telephone number (e.g., a number associated with SIP user device 180) and a Simple Object Access Protocol (SOAP)-RPC Uniform Resource Identifier (URI) to SIP proxy server 140. SOAP may include a lightweight protocol intended for exchanging structured information in a decentralized, distributed environment. SOAP-RPC may include a uniform representation of remote procedure call (RPC) requests and responses. A URI may include a compact string of characters for identifying an abstract or physical resource (e.g., SIP proxy server 140). PSTN message 415 may include an ISUP Initial Address Message (IAM) (e.g., a message that may inform a device that a call is to be established, and may include a called number, a calling number, a type of service, and other optional parameters).

Call controller 160 (e.g., via PSTN message 415) may create an outbound call leg to bridge SIP user device 180 and PSTN user device 190, and may provide data 410 and PSTN message 415 to network device 170 (e.g., via PSTN 150). Network device 170 may receive data 410 and PSTN message 415, and may perform a standard mapping based on data 410 and PSTN message 415. Network device 170 may generate a SIP INVITE request 420 that includes an outbound telephone number (e.g., a number associated with SIP user device 180), and may provide data 410 and SIP INVITE request 420 to SIP proxy server 140 (e.g., via SIP network 110). SIP proxy server 140 may receive data 410 and SIP INVITE request 420, and may perform a lookup on the outbound telephone number. SIP proxy server 140 may associate data 410 with SIP INVITE request 420 to produce a modified SIP INVITE request 425. For example, in one implementation, SIP proxy server 140 may insert the SOAP-RPC URI into SIP INVITE request 420 (e.g., as a SIP header) to produce modified SIP INVITE request 425. SIP proxy server 140 may provide modified SIP INVITE request 425 to remote call controller 120.

As further shown in FIG. 4A, remote call controller 120 may receive modified SIP INVITE request 425, and may extract the SOAP-RPC URI from the SIP header of modified SIP INVITE request 425. Remote call controller 120 may invoke a RPC method (e.g., a SOAP-RPC method, such as "OnCallOffered") on call controller 160 using modified SIP INVITE request 425 (e.g., using the SOAP-RPC URI from modified SIP INVITE request 425), as indicated by reference number 430. In one example, the SOAP-RPC URI may include information identifying or pointing to remote call controller 120. Call controller 160 may receive the RPC invocation and modified SIP INVITE request 425, and may execute the RPC method (e.g., may execute the "OnCallOffered" SOAP-RPC method). Remaining interactions among components of exemplary network portion 400 may depend on a call plan, features, etc. associated with the calling party. In one example, it may be assumed that call 405 requires use of a SIP REFER method.

Call controller 160 may further modify modified SIP INVITE request 425 (e.g., by modifying mapped headers of SIP INVITE request 425 and/or by specifying non-mapped headers of SIP INVITE request 425) to produce a further modified SIP INVITE request. Call controller 160 may provide a "Transfer" RPC invocation and the further modified SIP INVITE request, as indicated by reference number 435, to remote call controller 120. Remote call controller 120 may receive the "Transfer" RPC invocation and the further modified SIP INVITE request, and may provide the further modified SIP INVITE request to SIP user device 180, as indicated by reference number 440. Remote call controller 120 may create a SIP back-to-back user agent call control instance using information associated with further modified SIP INVITE request 440. A back-to-back user agent (B2BUA) may act as a user agent to both ends of a SIP call, and may handle SIP signaling between both ends of the call, from call establishment to termination.

If the called party answers further modified SIP INVITE request 440, SIP user device 180 may provide a SIP INVITE "200" message 445 (e.g., a SIP "OK" response) to remote call controller 120. Remote call controller 120 may receive SIP INVITE "200" message 445, and may provide SIP INVITE "200" message 445 to network device 170 (e.g., via SIP proxy server 140 and SIP network 110). Remote call controller 120 may provide SIP INVITE "200" message 445 and an "OnAnswer" RPC invocation 450 to call controller 160.

As shown in FIG. 4B, network device 170 may receive SIP INVITE "200" message 445, and may create a PSTN Answer Message (ANM) 455 (e.g., an ISUP ANM that may be sent when the called party answers a call) using standard mapping rules. Network device 170 may provide PSTN ANM 455 to call controller 160 (e.g., via PSTN 150). Call controller 160 may bridge audio between SIP user device 180 and PSTN user device 190, and, in one example, the called party (e.g., associated with SIP user device 180) may decide to transfer the call (e.g., call 405) to another called party (e.g., to another SIP user device). SIP user device 180 may send a SIP REFER request 460 (e.g., via SIP network 110) to remote call controller 120 when the called party selects a transfer mechanism (e.g., a transfer button associated with SIP user device 180).

Remote call controller 120 may receive SIP REFER request 460, and may generate an "OnRefer" RPC invocation 465. Remote call controller 120 may provide SIP REFER request 460 and "OnRefer" RPC invocation 465 to call controller 160, via network device 170 and/or PSTN 150. Call controller 160 may receive SIP REFER request 460 and "OnRefer" RPC invocation 465, may parse SIP REFER request 460, and may create an outbound call 470. If the other called party is associated with a referred SIP user device (e.g., as specified by SIP REFER request 460), outbound call 470 may be routed to the referred SIP user device in a similar manner as described above in connection with call 405. For example, remote call controller 120 may generate a SIP INVITE request 475 (e.g., similar to further modified SIP INVITE request 440), and may provide SIP INVITE request 475 to the referred SIP user device.

Although FIGS. 4A and 4B show exemplary components of network portion 400, in other implementations, network portion 400 may contain fewer, different, or additional components than depicted in FIGS. 4A and 4B. In still other implementations, one or more components of network portion 400 may perform one or more other tasks described as being performed by one or more other components of network portion 400.

FIG. 5 depicts a diagram of an alternative exemplary network 500 in which systems and methods described herein may be implemented. As illustrated, network 500 may include SIP network 110, which may include a call controller 510 and SIP proxy server 140. Network 500 may also include PSTN 150, which may include call controller 160. SIP network 110 may interconnect with PSTN 150 via network device 170, and may interconnect with SIP user device 180. PSTN 150 may interconnect with SIP network 110 via network device 170, and may interconnect with PSTN user device 190. Components of network 500 may interconnect via wired and/or wireless connections. A single SIP network, two call controllers, a single RPC interface, a single SIP proxy server, a single PSTN, a single network device, a single SIP user device, and a single PSTN user device have been illustrated in FIG. 5 for simplicity. In practice, there may be more SIP networks, call controllers, RPC interfaces, SIP proxy servers, PSTNs, network devices, SIP user devices, and/or PSTN user devices. Also, in some instances, one or more of the components of network 500 may perform one or more functions described as being performed by another one or more of the components of network 500.

SIP network 110, SIP proxy server 140, PSTN 150, call controller 160, network device 170, SIP user device 180, and PSTN user device 190 may include the features described above in connection with FIG. 1. Network 500 may perform functions similar to the functions performed by network 100 and network portion 400, as described above in connection with FIGS. 1, 4A, and 4B. In network 100, remote call controller 120 may be separate from call controller 160, and may communicate via a secure RPC mechanism (e.g., RPC interface 130). Such separation of remote call controller 120 and call controller 160 may be required for security reasons (e.g., to keep SIP point-of-presence isolated from an internal network, such as PSTN 150). In network 500, remote call controller 120 and RPC interface 130 may be replaced by call controller 510, and call controller 160 may directly communicate with call controller 510, rather than via a secure RPC mechanism.

Call controller 510 may include one or more server entities, or other types of computation or communication devices, that gather, process, search, and/or provide information in a manner described herein. In one implementation, call controller 510 may include a server (e.g., a computer system or an application) capable of facilitating PSTN-based (e.g., ISUP-based) and/or SIP-based communications.

An outbound call (e.g., an ISUP call, such as call 405) from PSTN user device 190 may be provided to network device 170, and network device 170 may map the outbound call to a SIP-based call. The SIP-based call may be provided to call controller 510, and call controller 510 may provide the SIP-based call to the called party (e.g., via SIP user device 180). In one implementation, network device 170 and call controller 510 may provide a set of SIP call control functions, which may enable call controller 160 to perform SIP-specific operations on a call provided in the SIP network. For example, network device 170 and call controller 510 may enable a SIP REFER request (e.g., SIP REFER request 460) to be processed when the called party selects a transfer mechanism (e.g., a transfer button associated with SIP user device 180).

Figure 6:
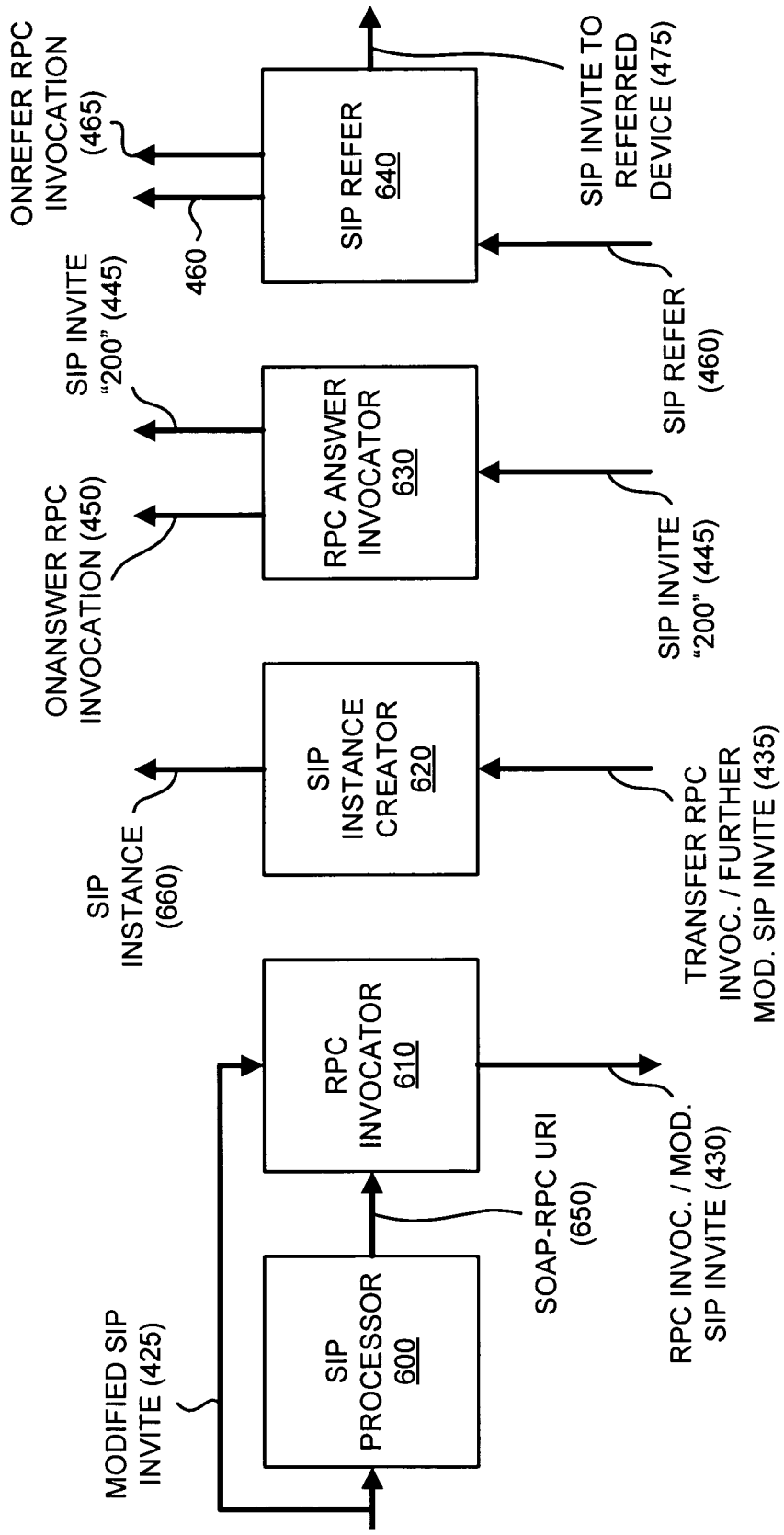
FIG. 6 illustrates a diagram of exemplary functional components of the remote call controller of the network depicted in FIG. 1.

FIG. 6 illustrates a diagram of exemplary functional components of remote call controller 120. As illustrated, remote call controller 120 may include SIP processor logic 600, RPC invocator logic 610, SIP instance creator logic 620, RPC answer invocator logic 630, and SIP refer logic 640. The functions described in FIG. 6 may be performed by one or more of the exemplary components of device 200 depicted in FIG. 2.

SIP processor logic 600 may include any hardware, software, or combination of hardware and software based logic (e.g., processing logic 220) that receives modified SIP INVITE request 425, and extracts a SOAP-RPC URI 650 from the SIP header of modified SIP INVITE request 425. SOAP-RPC URI 650 may include a uniform representation of RPC requests and responses, and a compact string of characters for identifying an abstract or physical resource. In one example, SOAP-RPC URI 650 may include information identifying or pointing to remote call controller 120. SIP processor logic 600 may provide SOAP-RPC URI 650 to RPC invocator logic 610.

RPC invocator logic 610 may include any hardware, software, or combination of hardware and software based logic (e.g., processing logic 220) that receives modified SIP invite 425 and SOAP-RPC URI 650, and invokes a RPC method (e.g., a SOAP-RPC method, such as "OnCallOffered") on call controller 160 using modified SIP INVITE request 425 (e.g., using the SOAP-RPC URI from modified SIP INVITE request 425), as indicated by reference number 430.

SIP instance creator logic 620 may include any hardware, software, or combination of hardware and software based logic (e.g., processing logic 220) that receives (e.g., from call controller 160) a "Transfer" RPC invocation and further modified SIP INVITE request 440, as indicated by reference number 435. In one exemplary implementation, SIP instance creator logic 620 may create a SIP back-to-back user agent call control instance 660 using information associated with further modified SIP INVITE request 440. SIP back-to-back user agent call control instance 660 may act as a user agent to both ends of a SIP call, and may handle SIP signaling between both ends of the call, from call establishment to termination.

RPC answer invocator logic 630 may include any hardware, software, or combination of hardware and software based logic (e.g., processing logic 220) that receives SIP INVITE "200" message 445, and provides SIP INVITE "200" message 445 to network device 170 (e.g., via SIP proxy server 140 and SIP network 110). RPC answer invocator logic 630 may generate "OnAnswer" RPC invocation 450 based on SIP INVITE "200" message 445, and may provide SIP INVITE "200" message 445 and "OnAnswer" RPC invocation 450 to call controller 160.

SIP refer logic 640 may include any hardware, software, or combination of hardware and software based logic (e.g., processing logic 220) that receives SIP REFER request 460 from SIP user device 180 when the called party selects a transfer mechanism (e.g., a transfer button associated with SIP user device 180). SIP refer logic 640 may generate "OnRefer" RPC invocation 465 based on SIP REFER request 460, and may provide SIP REFER request 460 and "OnRefer" RPC invocation 465 to call controller 160, via network device 170 and/or PSTN 150. SIP refer logic 640 may generate SIP INVITE request 475 (e.g., addressed to a referred SIP user device associated with SIP REFER request 460), and may provide SIP INVITE request 475 to the referred SIP user device.

Although FIG. 6 shows exemplary functional components of remote call controller 120, in other implementations, remote call controller 120 may contain fewer, different, or additional functional components than depicted in FIG. 6. In still other implementations, one or more functional components of remote call controller 120 may perform one or more other tasks described as being performed by one or more other functional components of remote call controller 120.

FIGS. 7-9B depict a flow chart of an exemplary process 700 for providing one or more SIP call control functions to a PSTN-based call controller, according to implementations described herein. In one implementation, process 700 may be performed by remote call controller 120. In another implementation, some or all of process 700 may be performed by another device or group of devices, including or excluding remote call controller 120.

As illustrated in FIG. 7, process 700 may begin with receipt of information associated with an outbound call from a calling party via a PSTN (block 710). For example, in implementations described above in connection with FIG. 4A, a calling party may originate call 405 (e.g., an ISUP call), using PSTN user device 190, to a telephone number associated with PSTN 150 (not shown in FIG. 4A). PSTN 150 may route call 405 to call controller 160. Call controller 160 may interact with the calling party, via PSTN user device 190, and may decide to transfer call 405 to a called party associated with SIP user device 180. Call controller 160 may identify a termination for SIP user device 180, and may generate data 410 and PSTN message 415. Call controller 160 (e.g., via PSTN message 415) may create an outbound call leg to bridge SIP user device 180 and PSTN user device 190, and may provide data 410 and PSTN message 415 to network device 170. Network device 170 may generate SIP INVITE request 420 that includes an outbound telephone number (e.g., a number associated with SIP user device 180), and may provide data 410 and SIP INVITE request 420 to SIP proxy server 140. SIP proxy server 140 may associate data 410 with SIP INVITE request 420 to produce modified SIP INVITE request 425. Remote call controller 120 may receive modified SIP INVITE request 425, and may extract a SOAP-RPC URI from a SIP header of modified SIP INVITE request 425.

As further shown in FIG. 7, a request for an outbound call from the PSTN may be generated using a remote procedure call (RPC) interface (block 720). For example, in implementations described above in connection with FIG. 4A, remote call controller 120 may invoke a RPC method (e.g., a SOAP-RPC method, such as "OnCallOffered") on call controller 160 using modified SIP INVITE request 425 (e.g., using the SOAP-RPC URI from modified SIP INVITE request 425), as indicated by reference number 430. In one example, the SOAP-RPC URI may include information identifying or pointing to remote call controller 120.

Returning to FIG. 7, communication of the outbound call with a SIP-based called party may be enabled via the RPC interface (block 730). For example, in implementations described above in connection with FIG. 4A, call controller 160 may provide a "Transfer" RPC invocation and a further modified SIP INVITE request, as indicated by reference number 435, to remote call controller 120. Remote call controller 120 may provide the further modified SIP INVITE request to SIP user device 180, as indicated by reference number 440, and may create a SIP back-to-back user agent call control instance using information associated with further modified SIP INVITE request 440. If the called party answers SIP INVITE request 440, SIP user device 180 may provide SIP INVITE "200" message 445 (e.g., a SIP "OK" response) to remote call controller 120. Remote call controller 120 may provide SIP INVITE "200" message 445 and "OnAnswer" RPC invocation 450 to call controller 160. Call controller 160 may bridge audio between SIP user device 180 and PSTN user device 190, and, in one example, the called party (e.g., associated with SIP user device 180) may decide to transfer the call (e.g., call 405) to another called party (e.g., to another SIP user device). SIP user device 180 may send SIP REFER request 460 (e.g., via SIP network 110) to remote call controller 120 when the called party selects a transfer mechanism (e.g., a transfer button associated with SIP user device 180).

Process blocks 710/720 may include the process blocks depicted in FIG. 8. As shown in FIG. 8, process blocks 710/720 may include receiving a modified SIP INVITE request associated with the outbound call (block 800), and extracting a SOAP-RPC URI from a header of the modified SIP INVITE request (block 810). For example, in implementations described above in connection with FIG. 6, SIP processor logic 600 of remote call controller 120 may receive modified SIP INVITE request 425, and may extract SOAP-RPC URI 650 from the SIP header of modified SIP INVITE request 425. SOAP-RPC URI 650 may include a uniform representation of RPC requests and responses, and a compact string of characters for identifying an abstract or physical resource. In one example, SOAP-RPC URI 650 may include information identifying or pointing to remote call controller 120.

As further shown in FIG. 8, process blocks 710/720 may include generating an RPC invocation based on the SOAP-RPC URI (block 820), and providing the RPC invocation and the modified SIP INVITE request to a PSTN call controller (block 830). For example, in implementations described above in connection with FIG. 6, RPC invocator logic 610 of remote call controller 120 may receive modified SIP invite 425 and SOAP-RPC URI 650, and may invoke a RPC method (e.g., a SOAP-RPC method, such as "OnCallOffered") on call controller 160 using modified SIP INVITE request 425 (e.g., using the SOAP-RPC URI from modified SIP INVITE request 425), as indicated by reference number 430.

Figure 9B:
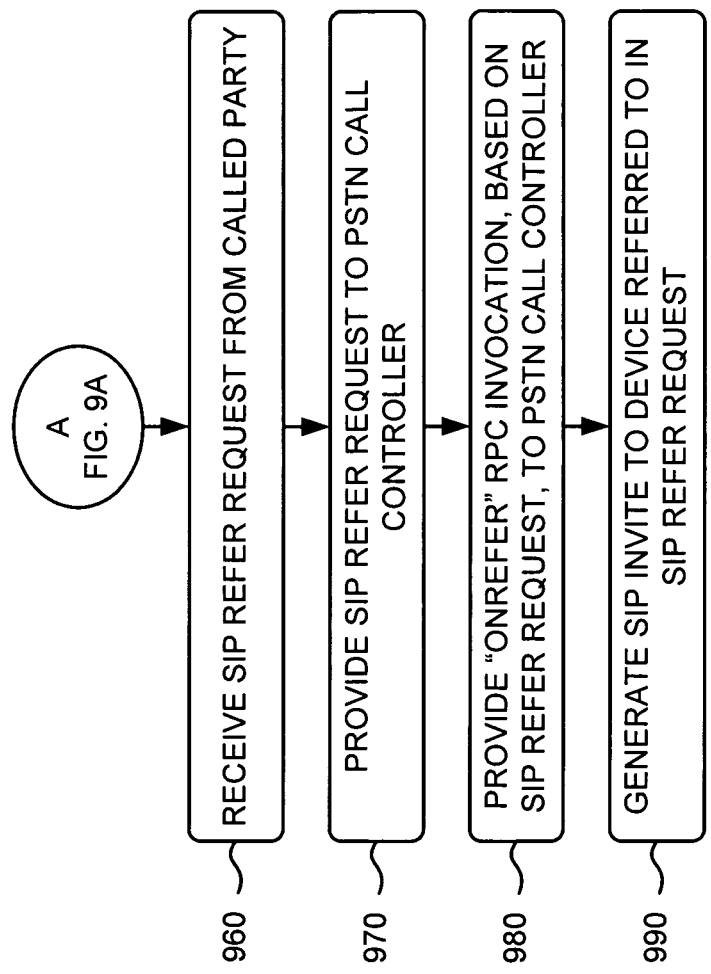

Process block 730 may include the process blocks depicted in FIGS. 9A and 9B. As shown in FIG. 9A, process block 730 may include receiving a transfer RPC invocation and a SIP INVITE request (block 900), creating a SIP back-to-back user agent call control instance based on the transfer RPC invocation and the SIP INVITE request (block 910), and providing the SIP INVITE request to the called party (block 920). For example, in implementations described above in connection with FIG. 4A, remote call controller 120 may receive the "Transfer" RPC invocation and the further modified SIP INVITE request, and may provide the further modified SIP INVITE request to SIP user device 180, as indicated by reference number 440. Remote call controller 120 may create a SIP back-to-back user agent call control instance using information associated with further modified SIP INVITE request 440. A back-to-back user agent (B2BUA) may act as a user agent to both ends of a SIP call, and may handle SIP signaling between both ends of the call, from call establishment to termination.

As further shown in FIG. 9A, process block 730 may include receiving a SIP INVITE "200" response from the called party (block 930), providing an "OnAnswer" RPC invocation and the SIP INVITE "200" response to the PSTN call controller (block 940), and providing the SIP INVITE "200" response to a network device (block 950). For example, in implementations described above in connection with FIG. 4A, if the called party answers further modified SIP INVITE request 440, SIP user device 180 may provide SIP INVITE "200" message 445 (e.g., a SIP "OK" response) to remote call controller 120. Remote call controller 120 may receive SIP INVITE "200" message 445, and may provide SIP INVITE "200" message 445 to network device 170 (e.g., via SIP proxy server 140 and SIP network 110). Remote call controller 120 may provide SIP INVITE "200" message 445 and "OnAnswer" RPC invocation 450 to call controller 160.

As shown in FIG. 9B, process block 730 may include receiving a SIP REFER request from the called party (block 960), providing the SIP REFER request to the PSTN call controller (block 970), providing an "OnRefer" RPC invocation, based on the SIP REFER request, to the PSTN call controller (block 980), and generating a SIP INVITE request to a device referred to in the SIP REFER request (block 990). For example, in implementations described above in connection with FIG. 4B, remote call controller 120 may receive SIP REFER request 460, and may generate "OnRefer" RPC invocation 465. Remote call controller 120 may provide SIP REFER request 460 and "OnRefer" RPC invocation 465 to call controller 160, via network device 170 and/or PSTN 150. Remote call controller 120 may generate SIP INVITE request 475 (e.g., similar to further modified SIP INVITE request 440), and may provide SIP INVITE request 475 to a referred SIP user device.

Figure 10A:
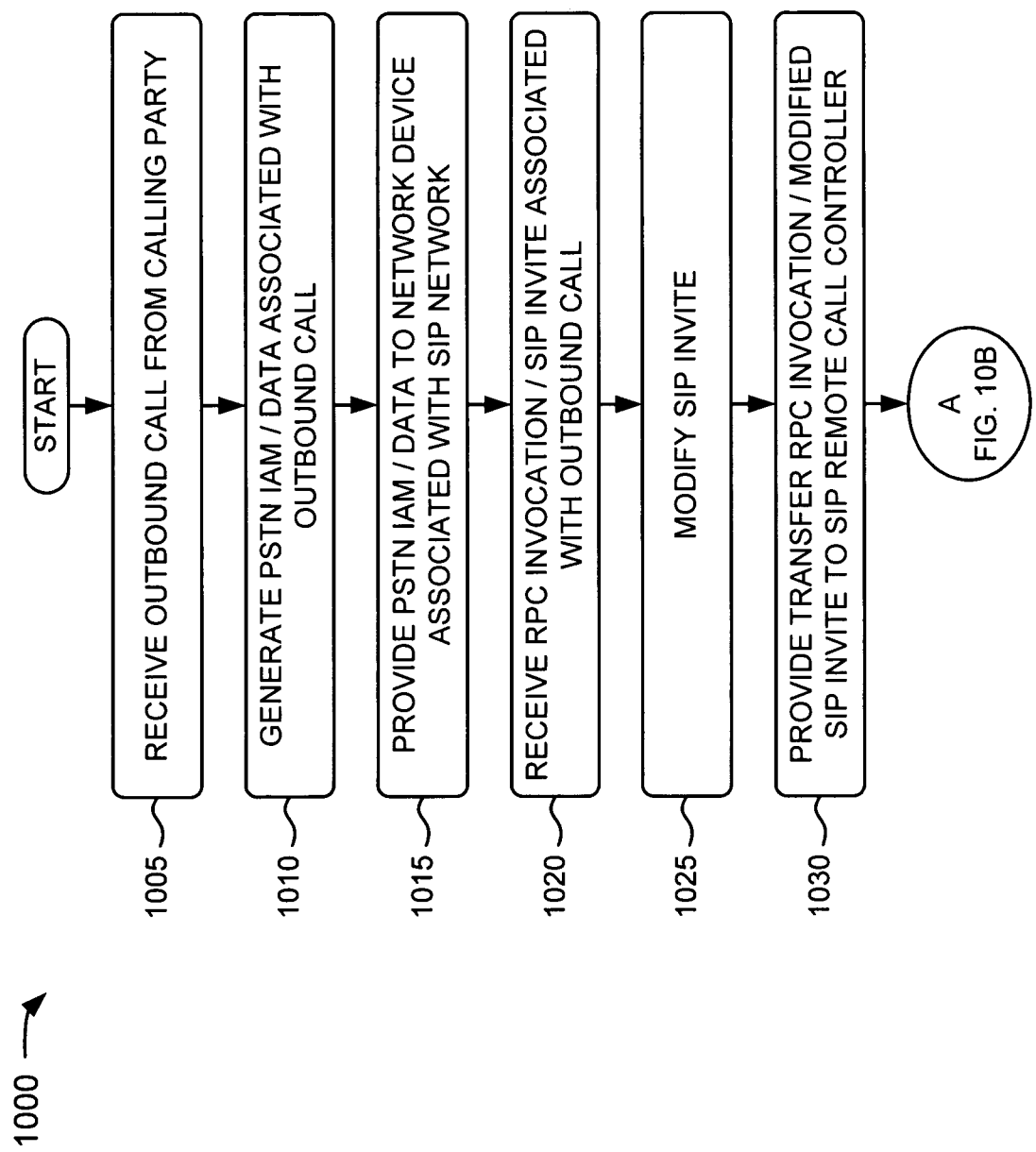

FIGS. 10A and 10B depict a flow chart of an exemplary process 1000 for providing one or more SIP call control functions to a PSTN-based call controller, according to implementations described herein. In one implementation, process 1000 may be performed by call controller 160. In another implementation, some or all of process 1000 may be performed by another device or group of devices, including or excluding call controller 160.

As illustrated in FIG. 10A, process 1000 may begin with receipt of an outbound call from a calling party (block 1005), generation of a PSTN IAM and/or data associated with the outbound call (block 1010), and providing the PSTN IAM and/or data to a network device associated with a SIP network (block 1015). For example, in implementations described above in connection with FIG. 4A, a calling party may originate call 405 (e.g., an ISUP call), using PSTN user device 190, to a telephone number associated with PSTN 150. PSTN 150 may route call 405 to call controller 160. Call controller 160 may interact with the calling party, via PSTN user device 190, and may decide to transfer call 405 to a called party associated with SIP user device 180. Call controller 160 may identify a termination for SIP user device 180, and may generate data 410 and PSTN message 415. PSTN message 415 may include an ISUP Initial Address Message (IAM) (e.g., a message that may inform a device that a call is to be established, and may include a called number, a calling number, a type of service, and other optional parameters). Call controller 160 (e.g., via PSTN message 415) may create an outbound call leg to bridge SIP user device 180 and PSTN user device 190, and may provide data 410 and PSTN message 415 to network device 170 (e.g., via PSTN 150).

As further shown in FIG. 10A, an RPC invocation and a SIP INVITE request, associated with the outbound call, may be received (block 1020), the SIP INVITE request may be modified (block 1025), and a transfer RPC invocation and the modified SIP INVITE request may be provided to a SIP remote call controller (block 1030). For example, in implementations described above in connection with FIG. 4A, call controller 160 may receive the RPC invocation and modified SIP INVITE request 425, and may execute the RPC method (e.g., may execute the "OnCallOffered" SOAP-RPC method). Call controller 160 may further modify modified SIP INVITE request 425 (e.g., by modifying mapped headers of SIP INVITE request 425 and/or by specifying non-mapped headers of SIP INVITE request 425) to produce a further modified SIP INVITE request. Call controller 160 may provide a "Transfer" RPC invocation and the further modified SIP INVITE request, as indicated by reference number 435, to remote call controller 120.

As shown in FIG. 10B, an "OnAnswer" RPC invocation and a PSTN ANM may be received (block 1035), and the calling party may be connected to the called party (block 1040). For example, in implementations described above in connection with FIGS. 4A and 4B, if the called party answers further modified SIP INVITE request 440, SIP user device 180 may provide SIP INVITE "200" message 445 (e.g., a SIP "OK" response) to remote call controller 120. Remote may provide SIP INVITE "200" message 445 to network device 170 (e.g., via SIP proxy server 140 and SIP network 110). Remote call controller 120 may provide SIP INVITE "200" message 445 and an "OnAnswer" RPC invocation 450 to call controller 160. Network device 170 may receive SIP INVITE "200" message 445, and may create PSTN Answer Message (ANM) 455 (e.g., an ISUP ANM that may be sent when the called party answers a call) using standard mapping rules. Network device 170 may provide PSTN ANM 455 to call controller 160 (e.g., via PSTN 150). Call controller 160 may bridge audio between SIP user device 180 and PSTN user device 190.

As further shown in FIG. 10B, an "OnRefer" RPC invocation and a SIP REFER request may be received (block 1045), and a new outbound call may be created based on the SIP REFER request (block 1050). For example, in implementations described above in connection with FIG. 4B, the called party (e.g., associated with SIP user device 180) may decide to transfer the call (e.g., call 405) to another called party (e.g., to another SIP user device). SIP user device 180 may send SIP REFER request 460 (e.g., via SIP network 110) to remote call controller 120 when the called party selects a transfer mechanism (e.g., a transfer button associated with SIP user device 180). Remote call controller 120 may receive SIP REFER request 460, and may generate "OnRefer" RPC invocation 465. Remote call controller 120 may provide SIP REFER request 460 and "OnRefer" RPC invocation 465 to call controller 160. Call controller 160 may receive SIP REFER request 460 and "OnRefer" RPC invocation 465, may parse SIP REFER request 460, and may create outbound call 470. If the other called party is associated with a referred SIP user device (e.g., as specified by SIP REFER request 460), outbound call 470 may be routed to the referred SIP user device.

Systems and/or methods described herein may provide one or more SIP call control functions to a PSTN-based call controller. The systems and/or methods may utilize a remote call controller, provided in a SIP network, which may present a secure Remote Procedure Call (RPC) interface to a call controller provided in a PSTN. For example, in one implementation, the remote call controller may receive an outbound call from a calling party, via the PSTN call controller, and may generate a request for the outbound call from the PSTN call controller using the RPC interface. The generated request may enable communication of the outbound call with a SIP-based called party, via the RPC interface. In one example, the PSTN call controller may modify, route, and/or control communications with the SIP-based called party, via the RPC interface.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-10B, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by one or more devices of a Session Initiation Protocol (SIP) network and from a SIP proxy server, a modified SIP INVITE request associated with an outbound call,
        the outbound call being from a Public Switched Telephone Network (PSTN)-based user device that is associated with a calling party;
    extracting, by the one or more devices of the SIP network, data associated with a SIP-based user device from the modified SIP INVITE request,
        the data including a Simple Object Access Protocol (SOAP)-remote procedure call (RPC) Uniform Resource Identifier (URI);
    generating, by the one or more devices of the SIP network, a RPC invocation based on the SOAP-RPC URI;
    providing, by the one or more devices of the SIP network and to a PSTN-based call controller, the RPC invocation and the modified SIP INVITE request by using a RPC interface of the one or more devices of the SIP network; and
    enabling, by the one or more devices of the SIP network and for the outbound call, communication, via the RPC interface, with the SIP-based user device.

2. The method of claim 1, where the RPC invocation comprises an invocation of an "OnCallOffered" RPC method.

3. The method of claim 1, where enabling the communication comprises:
    receiving a transfer RPC invocation and a SIP INVITE request;
    creating, for the outbound call, a SIP back-to-back user agent call control instance based on the transfer RPC invocation and the SIP INVITE request;
    providing the SIP INVITE request to the SIP-based user device;
    receiving a SIP INVITE "200" message from the SIP-based user device based on the SIP request;
    providing an "OnAnswer" RPC invocation and the SIP INVITE "200" message to the PSTN-based call controller; and
    establishing the communication with the SIP-based user device based on the "OnAnswer" RPC invocation and the SIP INVITE "200" message.

4. The method of claim 3, where enabling the communication further comprises:
    receiving a SIP REFER request from the SIP-based user device;
    providing the SIP REFER request to the PSTN-based call controller;
    providing an "OnRefer" remote procedure call (RPC) invocation, based on the SIP REFER request, to the PSTN-based call controller; and
    providing another SIP INVITE request to another SIP-based user device referred to in the SIP REFER request.

5. The method of claim 1, where the one or more devices include a SIP-based remote call controller.

6. A method comprising:
receiving, by one or more devices of a Public Switched Telephone Network (PSTN) network, an outbound call associated with a calling party;
generating, by the one or more devices of the PSTN network, a PSTN Initial Address Message (IAM) associated with the outbound call;
providing, by the one or more devices of the PSTN network, the PSTN IAM to a network device associated with a Session Initiation Protocol (SIP) network;
receiving, by the one or more devices of the PSTN network, a remote procedure call (RPC) invocation and a SIP INVITE request associated with the outbound call;
modifying, by the one or more devices of the PSTN network, the SIP INVITE request to produce a modified SIP INVITE request;
providing, by the one or more devices of the PSTN network, a transfer remote procedure call (RPC) invocation and the modified SIP INVITE request to a SIP-based remote call controller;
receiving an "OnAnswer" RPC invocation and a PSTN Answer Message (ANM) based on the transfer RPC invocation and the modified SIP INVITE request; and
establishing, for the outbound call, communication with a SIP-based device based on the "OnAnswer" RPC invocation and the PSTN ANM.

7. The method of claim 6, where providing the PSTN IAM comprises:
providing data to the network device associated with the SIP network, the data including at least one of:
a telephone number associated with the SIP-based device; or
a Simple Object Access Protocol (SOAP-RPC Uniform Resource Identifier (URI).

8. The method of claim 7, where the RPC invocation comprises an invocation of an "OnCallOffered" RPC method.

9. The method of claim 6, further comprising:
receiving an "OnRefer" RPC invocation and a SIP REFER request; and
creating a new outbound call based on the SIP REFER request.

10. The method of claim 9, further comprising:
establishing the communication of the new outbound call with another SIP-based device referred to in the SIP REFER request.

11. The method of claim 6, where the one or more devices include a PSTN-based call controller.

12. A device comprising:
one or more processors to:
receive, from a Session Initiation Protocol (SIP) proxy server, a modified SIP INVITE request associated with an outbound call from a Public Switched Telephone Network (PSTN)-based user device that is associated with a calling party,
extract data associated with a SIP-based user device from the modified SIP INVITE request,
the data including a Simple Object Access Protocol (SOAP)-remote procedure call (RPC) Uniform Resource Identifier (URI), generate a RPC invocation based on the SOAP-RPC URI,
provide, to a PSTN-based call controller, the RPC invocation and the modified SIP INVITE request by using a RPC interface of a SIP network, and
enable, for the outbound call, communication, via the RPC interface with the SIP-based user device.

13. The device of claim 12, where the device comprises a SIP-based remote call controller.

14. The device of claim 12, where, when enabling the communication, the one or more processors are to:
provide SIP call control functions to the PSTN-based call controller for handling the outbound call.

15. The device of claim 12, where the RPC invocation comprises invocation of an "OnCallOffered" RPC method.

16. The device of claim 12, where, when enabling the communication, the one or more processors are to:
receive a transfer RPC invocation and a Session Initiation Protocol (SIP) INVITE request,
create, for the outbound call, a SIP back-to-back user agent call control instance based on the transfer RPC invocation and the SIP INVITE request,
provide the SIP INVITE request to the SIP-based user device,
receive a SIP INVITE "OK" message from the SIP-based user device based on the SIP request,
provide an "OnAnswer" RPC invocation and the SIP INVITE "OK" message to the PSTN-based call controller, and
establish, for the outbound call, the communication with the SIP-based device based on the "OnAnswer" RPC invocation and the SIP INVITE "OK" message.

17. The device of claim 16, where, when enabling the communication, the one or more processors are further to:
receive a SIP REFER request from the SIP-based user device,
provide the SIP REFER request to the PSTN-based call controller,
provide an "OnRefer" RPC invocation, based on the SIP REFER request, to the PSTN-based call controller, and
generate another SIP INVITE request to a SIP-based device referred to in the SIP REFER request.

18. The device of claim 12, where the device includes a SIP-based remote call controller.

19. A system comprising:
a Public Switched Telephone Network (PSTN)-based call controller to:
receive an outbound call associated with a calling party, the outbound call being from a PSTN-based user device that is associated with the calling party,
provide the outbound call to a Session Initiation Protocol (SIP) network; and
a SIP-based remote call controller to:
receive information associated with the outbound call,
provide, to the PSTN-based call controller, a request for the outbound call by using a remote procedure call (RPC) interface of the SIP-based remote controller, and
enable, for the outbound call, communication, via the RPC interface, with a SIP-based user device that is associated with a called party,
the PTSN-based call controller being further to:
receive an "OnRefer" RPC invocation and a SIP REFER request,
create a new outbound call based on the SIP REFER request, and
establish, for the new outbound call, communication with another SIP-based user device referred to in the SIP REFER request.

20. The system of claim 19, where the PSTN-based call controller is further to:
receive a SIP INVITE request associated with the outbound call from the SIP-based remote call controller, modify the SIP INVITE request to produce a modified SIP INVITE request, provide a transfer RPC invocation and the modified SIP INVITE request to the SIP-based remote call controller, receive an "OnAnswer" RPC invocation and a PSTN Answer Message (ANM) based on the transfer RPC invocation and the modified SIP INVITE request, and establish, for the outbound call, communication with the SIP-based device based on the "OnAnswer" RPC invocation and the PSTN ANM.

21. The system of claim 19, where the SIP-based remote call controller is further to:

receive the SIP REFER request from the SIP-based user device, provide the SIP REFER request to the PSTN-based call controller, and provide the "OnRefer" RPC invocation, based on the SIP REFER request, to the PSTN-based call controller.

22. The system of claim 19, where the PSTN-based call controller is further to:

execute an "OnCallOffered" SOAP-RPC method based on the "On Refer" RPC invocation.

* * * * *